US012715115B2

(12) United States Patent
Sekiguchi et al.

(10) Patent No.: US 12,715,115 B2
(45) Date of Patent: Aug. 25, 2026

(54) INFORMATION PROCESSING APPARATUS, INFORMATION PROCESSING METHOD, AND INFORMATION PROCESSING SYSTEM

(71) Applicant: SONY GROUP CORPORATION, Tokyo (JP)

(72) Inventors: Shunichi Sekiguchi, Tokyo (JP); Kazumi Aoyama, Tokyo (JP); Takayoshi Takayanagi, Tokyo (JP); Hirotaka Suzuki, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 200 days.

(21) Appl. No.: 18/567,953

(22) PCT Filed: Jul. 29, 2021

(86) PCT No.: PCT/JP2021/028016
§ 371 (c)(1),
(2) Date: Dec. 7, 2023

(87) PCT Pub. No.: WO2022/264436
PCT Pub. Date: Dec. 22, 2022

(65) Prior Publication Data

US 2024/0269830 A1 Aug. 15, 2024

Related U.S. Application Data

(60) Provisional application No. 63/202,515, filed on Jun. 15, 2021.

(51) Int. Cl.
*B25J 9/16* (2006.01)

(52) U.S. Cl.
CPC .......... *B25J 9/1612* (2013.01); *B25J 9/1697* (2013.01)

(58) Field of Classification Search
CPC .................. B25J 9/1612; B25J 9/1697; G05B 2219/39539; G05B 2219/39543; G05B 2219/40584
See application file for complete search history.

(56) References Cited

U.S. PATENT DOCUMENTS 11,400,598 B2 * 8/2022 Tomioka ................ B25J 9/1697
11,833,682 B2 * 12/2023 Ikeda ..................... B25J 9/1697
(Continued)

FOREIGN PATENT DOCUMENTS

EP 3792013 A1 3/2021
JP 2004-268161 A 9/2004
(Continued)

OTHER PUBLICATIONS

Machine translation of JP 2010-244413A (Year: 2010).*
(Continued)

*Primary Examiner* — Robert T Nguyen
(74) *Attorney, Agent, or Firm* — CHIP LAW GROUP

(57) ABSTRACT

An information processing apparatus according to an embodiment of the present technology includes a region calculation unit. The region calculation unit calculates, on the basis of operation information regarding an operation performed on a target object and an image of the target object, a hand area when the operation is performed on the target object by using an image generator or a predictor. This enables a high-precision operation. Moreover, a dataset used for the image generator and the predictor can be collected more easily. Therefore, a massive amount of datasets can be built and can be applied to various target objects.

19 Claims, 7 Drawing Sheets

(56) References Cited

U.S. PATENT DOCUMENTS

| | | | | |
|---|---|---|---|---|
| 12,311,073 | B2 * | 5/2025 | Kusaba | G06T 7/0012 |
| 2017/0060254 | A1 * | 3/2017 | Molchanov | G06N 3/082 |
| 2017/0129101 | A1 * | 5/2017 | Sonoda | B25J 9/1612 |
| 2020/0019864 | A1 * | 1/2020 | Gu | B25J 9/1697 |
| 2020/0094406 | A1 * | 3/2020 | Kusano | B25J 9/1669 |
| 2020/0301500 | A1 | 9/2020 | Wilde et al. | |
| 2021/0078170 | A1 * | 3/2021 | Jiang | B25J 15/08 |
| 2022/0388162 | A1 * | 12/2022 | Fan | G06N 3/09 |

FOREIGN PATENT DOCUMENTS

| | | | |
|---|---|---|---|
| JP | 2010-244413 | A | 10/2010 |
| JP | 2014-106603 | A | 6/2014 |
| JP | 2015-054378 | A | 3/2015 |
| JP | 2016-115179 | A | 6/2016 |
| JP | 2020-107142 | A | 7/2020 |
| WO | 2019/059364 | A1 | 3/2019 |

OTHER PUBLICATIONS

Jan Wohlke et al: "Model-based Hand Pose Estimation for Generalized Hand Shape with Appearance Normalization", Jul. 2, 2018 (Jul. 2, 2018), 8 pgs., XP081110251.

International Search Report and Written Opinion of PCT Application No. PCT/JP2021/028016, issued on Oct. 26, 2021, 11 pages of ISRWO.

* cited by examiner

INFORMATION PROCESSING APPARATUS, INFORMATION PROCESSING METHOD, AND INFORMATION PROCESSING SYSTEM

CROSS REFERENCE TO RELATED APPLICATIONS

This application is a U.S. National Phase of International Patent Application No. PCT/JP2021/028016 filed on Jul. 29, 2021, which claims priority benefit of Patent Application No. US 63/202,515 filed in the U.S Patent Office on Jun. 15, 2021. Each of the above-referenced applications is hereby incorporated herein by reference in its entirety.

TECHNICAL FIELD

The present technology relates to an information processing apparatus, an information processing method, a program, and an information processing system that can be applied to a robot arm and the like.

BACKGROUND ART

Patent Literature 1 has described an article management system that manages articles present in a living space. In this article management system, a target article to be moved and a placement position where the target article is to be moved are specified, and a work robot holds and places the target article at the placement position without changing hold positions on the target article (specification paragraphs [0098] to [0109], FIGS. 2, 13, etc. in Patent Literature 1).

CITATION LIST

Patent Literature

Patent Literature 1: Japanese Patent Application Laid-open No. 2004-268161

DISCLOSURE OF INVENTION

Technical Problem

It is desirable to provide a technology enabling such a device that, for example, holds an object to execute a high-precision operation.

In view of the above-mentioned circumstances, it is an objective of the present technology to provide an information processing apparatus, an information processing method, a program, and an information processing system that enable a high-precision operation.

Solution to Problem

In order to accomplish the above-mentioned objective, an information processing apparatus according to an embodiment of the present technology includes a region calculation unit.

The region calculation unit calculates, on the basis of operation information regarding an operation performed on a target object and an image of the target object, a hand area when the operation is performed on the target object by using an image generator or a predictor.

In this information processing apparatus, the hand area when the operation is performed on the target object is calculated on the basis of operation information regarding the operation performed on the target object and the image of the target object by using the image generator or the predictor. This enables a high-precision operation.

The image generator may generate a pseudo-image when the operation is performed on the target object on the basis of the operation information and the image of the target object.

The image generator may set the operation information, the image of the target object, and an image when the operation is performed on the target object as a first learning dataset.

The region calculation unit may calculate the hand area on the basis of a difference between the pseudo-image and the image of the target object.

The predictor may set a black and white image indicating the operation information, the image of the target object, and the hand area when the operation is performed on the target object as a second learning dataset.

The operation may be an operation executed in a state of holding the target object.

The operation may be performed by a robot arm.

The information processing apparatus may further include a hold point calculation unit that calculates a hold point of a robot arm that performs the operation on the target object on the basis of the calculated hand area.

The hold point may be a parameter regarding position and attitude of a holding part of the robot arm that holds the target object.

The parameter may include x-coordinate, y-coordinate, z-coordinate, roll, pitch, and yaw.

The operation information may include instruction information for passing the target object to a user or execution information for causing the robot arm to execute the operation. In this case, the hold point calculation unit may calculate the hold point on the basis of the operation information.

The hold point may include a hold candidate point where the robot arm is capable of holding the target object. In this case, the hold point calculation unit may remove the hold candidate point included in the hand area and calculates the hold point on the basis of the instruction information.

The hold point may include a hold candidate point where the robot arm is capable of holding the target object. The hold point calculation unit may calculate the hold candidate point included in the hand area as the hold point on the basis of the execution information.

An information processing method according to an embodiment of the present technology is an information processing method to be executed by a computer system and includes calculating, on the basis of operation information regarding an operation performed on a target object and an image of the target object, a hand area when the operation is performed on the target object by using an image generator or a predictor.

A recording medium describing a program according to an embodiment of the present technology causes a computer system to execute the following step.

A step of calculating, on the basis of operation information regarding an operation performed on a target object and an image of the target object, a hand area when the operation is performed on the target object by using an image generator or a predictor.

An information processing system according to an embodiment of the present technology includes a robot arm and an information processing apparatus.

The robot arm performs an operation on a target object.

The information processing apparatus includes a region calculation unit that calculates, on the basis of operation information regarding an operation performed on a target object and an image of the target object, a hand area when the operation is performed on the target object by using an image generator or a predictor.

The information processing system may further include a hold point calculation unit that calculates a hold point of the robot arm on the basis of the calculated hand area.

The information processing system further include an output unit that outputs a control signal for causing the robot arm to execute the operation on the basis of the calculated hold point.

In the information processing system, the robot arm may include a sensor unit. In this case, the sensor unit may acquire the image of the target object.

MODE(S) FOR CARRYING OUT THE INVENTION

Hereinafter, embodiments according to the present technology will be described with reference to the drawings.

Figure 1A:
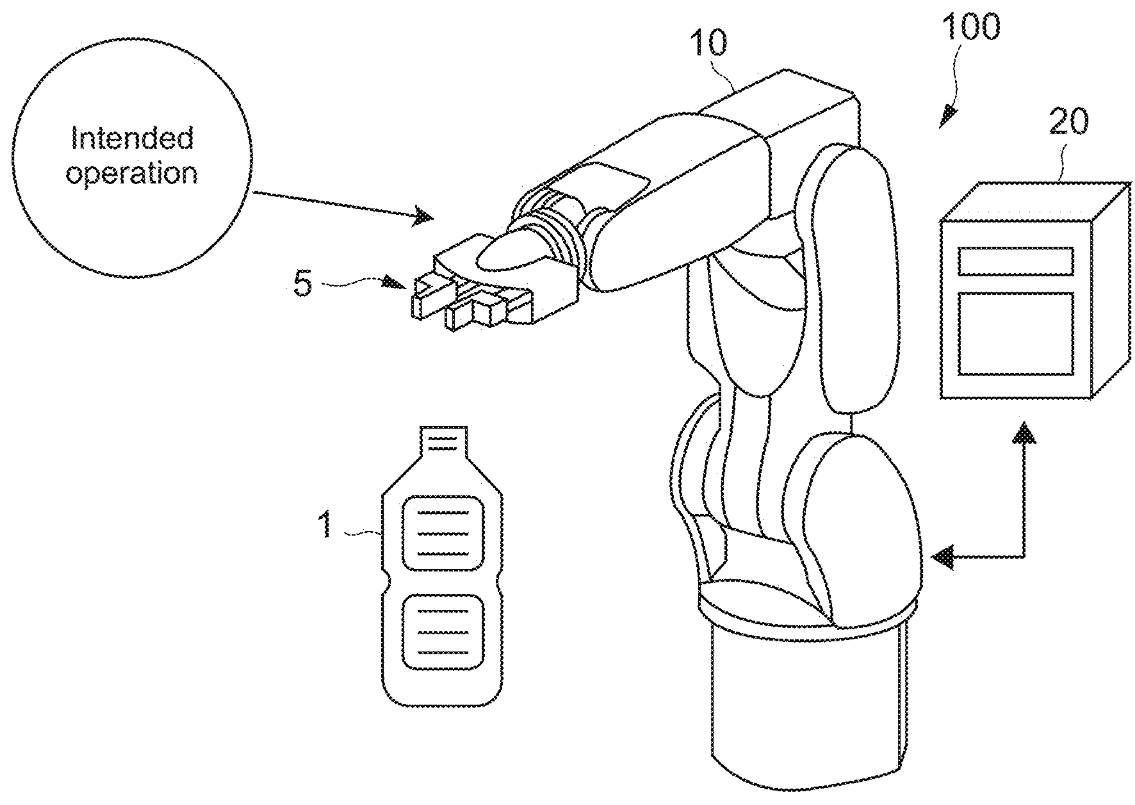
FIGS. 1A and 1B A diagram schematically showing an information processing system.
Figure 1B:
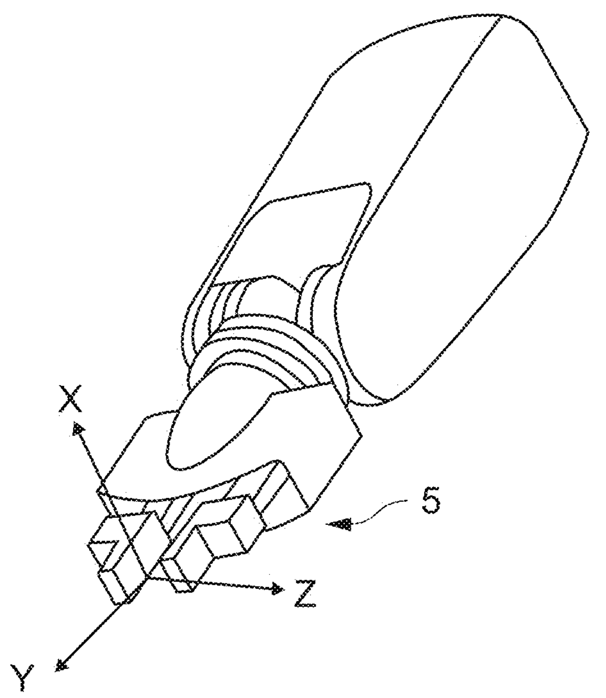

FIGS. 1A and 1B are diagrams schematically showing an information processing system according to the present technology. FIG. 1A is a schematic view showing a robot arm 10 and an information processing apparatus 20. FIG. 1B is a diagram showing a holding part 5 of the robot arm 10.

As shown in FIG. 1A, an information processing system 100 includes the robot arm 10 and the information processing apparatus 20.

The robot arm 10 includes the holding part 5 for holding a target object 1 which is a target to be held. The robot arm 10 executes an operation performed on the target object 1. In the present embodiment, the operation refers to an operation performed in a state of holding the target object 1. Examples of the operation include to pour, to open, to place the target object 1 at a predetermined position (to move the target object 1), and to pass the target object 1 to a user.

The information processing apparatus 20 calculates an area of the hand when the operation is performed on the target object 1 on the basis of operation information regarding the operation performed on the target object 1 and an image of the target object 1. In the present embodiment, the information processing apparatus 20 receives the image of the target object 1 acquired by the robot arm 10. Moreover, the information processing apparatus 20 provides the robot arm 10 with the operation information.

The operation information refers to information regarding the operation performed on the target object 1. In the present embodiment, the operation information includes instruction information for passing the target object 1 to the user and execution information for causing the robot arm 10 to execute the operation.

Hereinafter, the operation, the instruction information, and the execution information will be referred to as an intended operation. For example, in a case where an intended operation "pour" is provided to the robot arm 10 or "pour" is set as the intended operation, it means that execution information "pour" is provided to the robot arm 10 and the robot arm 10 executes an operation "pour". Similarly, in a case where the intended operation is "pass (to the user)", it means that instruction information "pass" is provided to the robot arm 10 and the robot arm 10 executes an operation "pass".

In the present embodiment, the information processing apparatus 20 calculates a hold point for the robot arm 10 to hold the target object 1 on the basis of the calculated hand area.

The hold point refers to a parameter regarding three-dimensional position and attitude of the holding part 5 attached to the robot arm. In the present embodiment, the hold point includes an x-coordinate, a y-coordinate, a z-coordinate, a roll, a pitch, and a yaw. For example, as shown in FIG. 1B, an X-axis, a Y-axis, and a Z-axis are set with respect to the holding part 5. Moreover, an attitude that is a reference for the holding part 5, e.g., an initial attitude of the holding part 5 in an operating halt state, may be set. Additionally, the parameter may include a degree of opening of the holding part 5 (distance between hold points), the number of holding parts 5 (number of fingers touching the target object 1), and the like.

In the present embodiment, hold candidate points where the holding part 5 is capable of holding the target object 1 are calculated by mechanical analysis. For example, using 3D model data (e.g., CAD data) about the target object 1 and 3D model data about the holding part 5, mechanical hold analysis (force closure analysis or the like) may be performed in a simulated environment. Moreover, the hold candidate points may be calculated for example by deep learning using a dataset including image information of the target object 1 and hold candidate points on the image information.

For example, in FIG. 1A, in a case where the intended operation is set to be "pour", the robot arm 10 sets a hold candidate point present in the calculated hand area as a hold point and holds the target object 1 (plastic bottle). Specifically, the target object 1 is held while the position and attitude of the holding part 5 are adjusted to the hold point.

Moreover, for example, in a case where the intended operation is set to be "pass", the robot arm 10 deletes the hold candidate point present in the calculated hand area from the hold candidate points and holds the target object 1.

That is, the information processing apparatus 20 calculates the hold point on the basis of the set intended operation and the calculated hand area.

Figure 2:
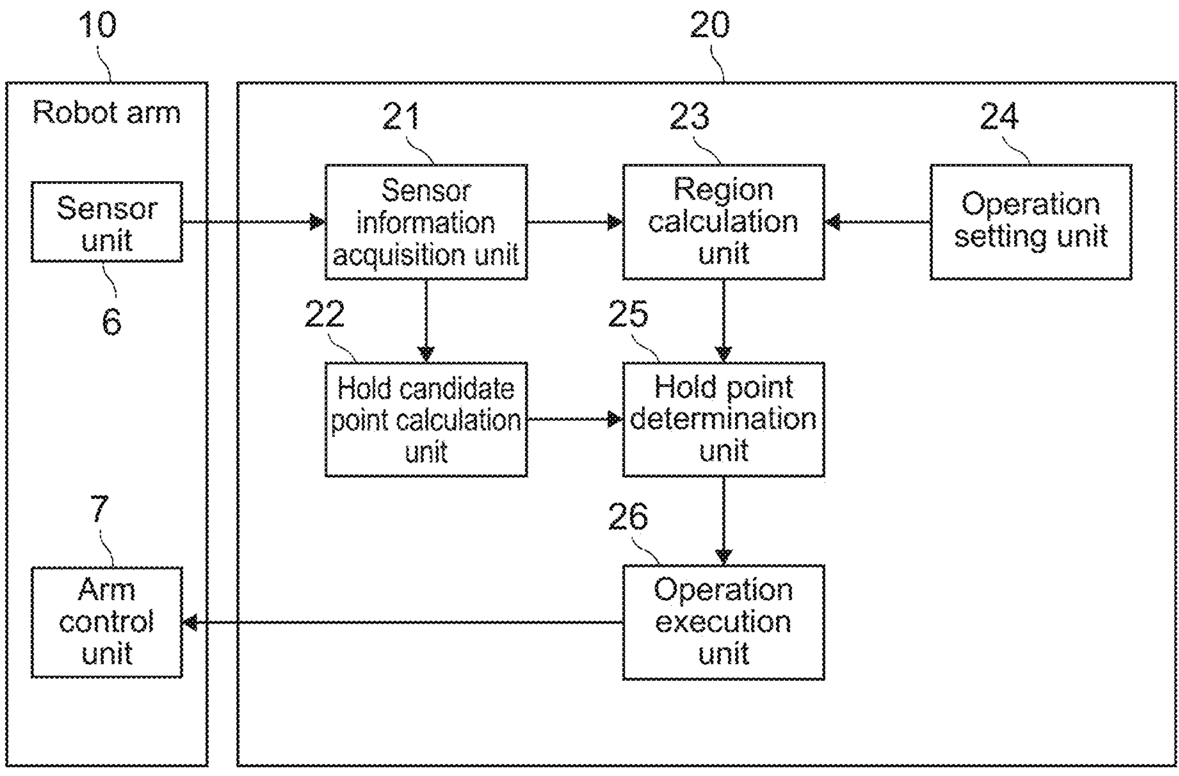
FIG. 2 A block diagram showing a configuration example of the information processing system.

FIG. 2 is a block diagram showing a configuration example of the information processing system 100.

As shown in FIG. 2, the robot arm 10 includes a sensor unit 6 and an arm control unit 7.

The sensor unit 6 acquires sensor information about position, shape, and the like of the target object 1. In the present embodiment, the sensor unit 6 includes an image pickup device that picks up an image of the target object 1. Additionally, the sensor unit 6 may include various sensors such as a depth sensor, an image sensor, a contact sensor, and a temperature sensor.

The arm control unit 7 controls the robot arm 10 for executing the provided intended operation. For example, the arm control unit 7 moves and rotates the holding part 5 in accordance with the calculated hold point. Moreover, for example, a control to drive each joint of the robot arm 10 may be made.

Figure 7:
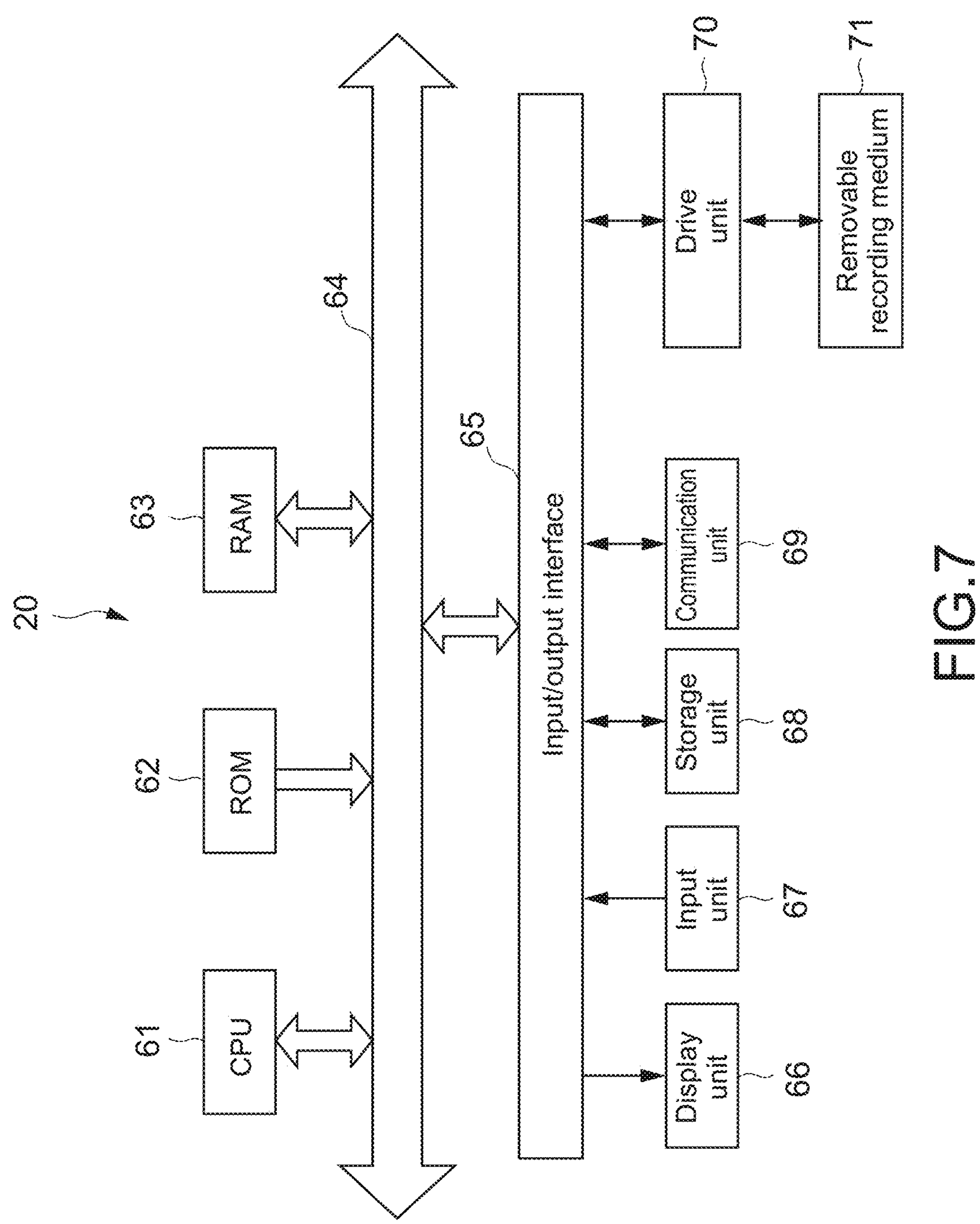
FIG. 7 A block diagram showing hardware configuration examples of an information processing apparatus.

The information processing apparatus 20 has hardware necessary for computer configurations for example including processors such as CPU, GPU, and DSP and memories such as ROM and RAM, and a storage device such as an HDD (see FIG. 7). An information processing method according to the present technology is executed for example by the CPU loading a program according to the present technology, which has been recorded on the ROM or the like in advance, to the RAM and executing it.

The information processing apparatus 20 can be realized for example by any computer such as a PC. As a matter of course, hardware such as FPGA and ASIC may be used.

In the present embodiment, a region calculation unit as a functional block is configured by the CPU executing a predetermined program. As a matter of course, dedicated hardware such as an integrated circuit (IC) may be used in order to realize the functional block.

The program is installed in the information processing apparatus 20 via various recording media for example. Alternatively, the program may be installed via the Internet or the like.

The type and the like of the recording medium on which the program is recorded are not limited, and any computer-readable recording medium may be used. For example, any computer-readable non-transitory storage medium may be used.

The information processing apparatus 20 includes a sensor information acquisition unit 21, a hold candidate point calculation unit 22, a region calculation unit 23, an operation setting unit 24, a hold point determination unit 25, and an operation execution unit 26.

The sensor information acquisition unit 21 acquires the sensor information acquired by the sensor unit 6. In the present embodiment, the sensor information acquisition unit 21 acquires a captured image including the target object. The acquired sensor information is provided to the hold candidate point calculation unit 22 and the region calculation unit 23.

The hold candidate point calculation unit 22 calculates hold candidate points for the target object. The method for calculating the hold candidate points is not limited. The hold candidate points may be calculated for example on the basis of 3D model data matching the target object from the captured image. Moreover, position and attitude of the target object may be acquired as the sensor information and the hold candidate points may be calculated by an iterative closest points (ICP) algorithm. The calculated hold candidate points are provided to the hold point determination unit 25.

The region calculation unit 23 calculates a hand area on the basis of the intended operation and the captured image. In the present embodiment, the region calculation unit 23 calculates the hand area by a method using an image generator (hereinafter, referred to as a first method) or a method using a predictor (hereinafter, referred to as a second method).

Figure 3A:
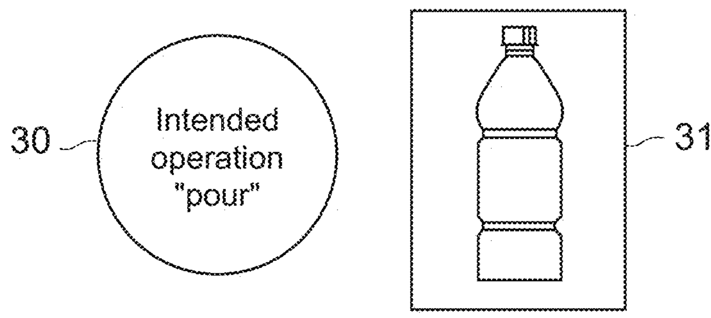
FIGS. 3A, 3B, and 3C A schematic view in a case of calculating a hand area by a first method.
Figure 3B:
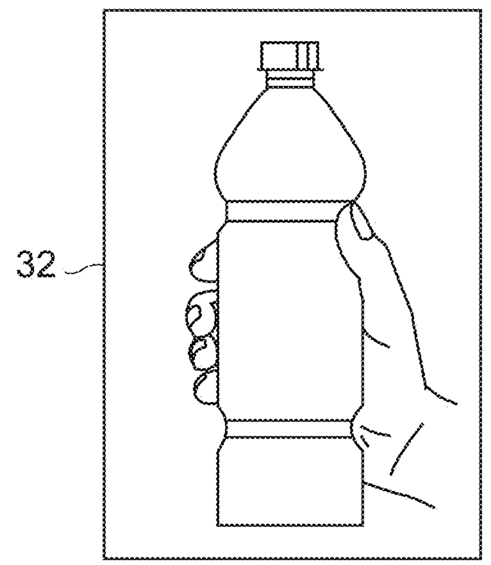
Figure 3C:
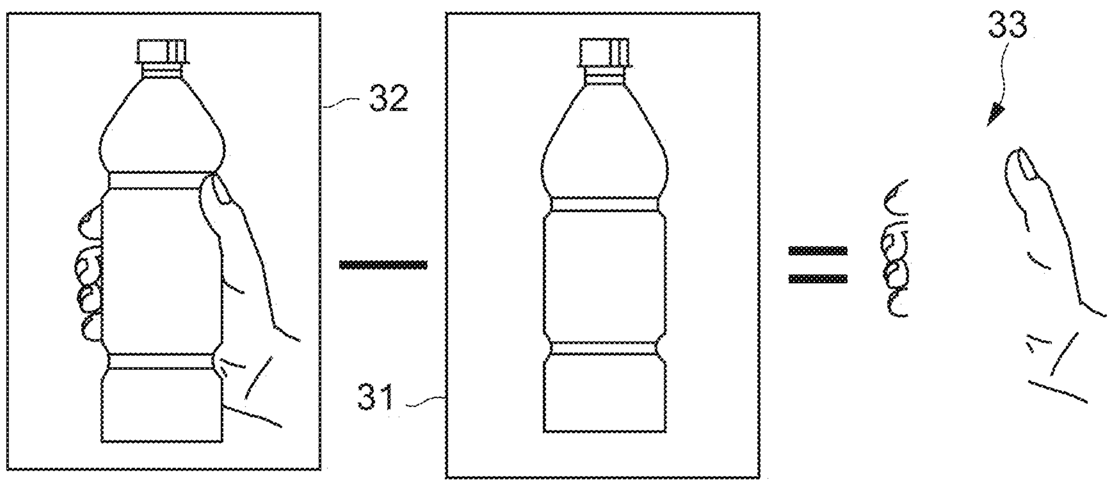

FIGS. 3A, 3B, and 3C are schematic views in a case of calculating a hand area by the first method. FIG. 3A is a schematic view showing a captured image including an intended operation and a target object which are input to the image generator. FIG. 3B is a schematic view showing a pseudo-image. FIG. 3C is a schematic view showing the hand area.

The image generator used for the first method receives the intended operation and the captured image including the target object as input data and generates the pseudo-image when the user holds the target object in accordance with the intended operation as output data. In FIG. 3A, an intended operation 30 "pour" is input and a captured image 31 of a plastic bottle that is the target object is input. As shown in FIG. 3B, the image generator generates a pseudo-image 32 when the input data in FIG. 3A is input.

In the present embodiment, the image generation function is acquired by a deep learning technology. An intended operation, an image of a target object, and an image in which a person holds the target object for performing the intended operation are used for a dataset (first learning dataset) used in learning for the image generator. For example, as shown in FIG. 3A, an intended operation (pour), an image of the plastic bottle, and an image when a person holds the plastic bottle as shown in FIG. 3B are used for the dataset.

It should be noted that target objects used in the image of the target object and the image in which the person holds the target object for performing the intended operation, which are used for the dataset, do not need to be the same object. For example, they may be plastic bottles different in shape and label. It is sufficient that they are target objects capable of realizing the intended operation "pour".

It should be noted that the method used in learning for the image generator is not limited. For example, a generative adversarial network such as Cycle GAN may be used. Moreover, supervised learning for input and supervisor (label) may be used for information used for the dataset.

Moreover, the region calculation unit 23 calculates a hand area from the generated pseudo-image. In the present embodiment, as shown in FIG. 3C, a hand area 33 is calculated on the basis of a difference between the pseudo-image 32 and the captured image 31.

Figure 4A:
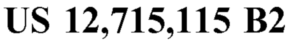
FIGS. 4A and 4B A schematic view in a case of calculating a hand area by a second method.
Figure 4A:
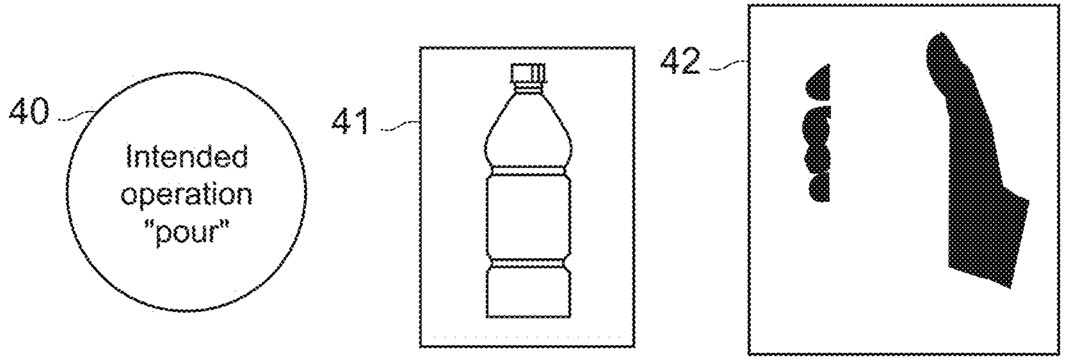
Figure 4B:
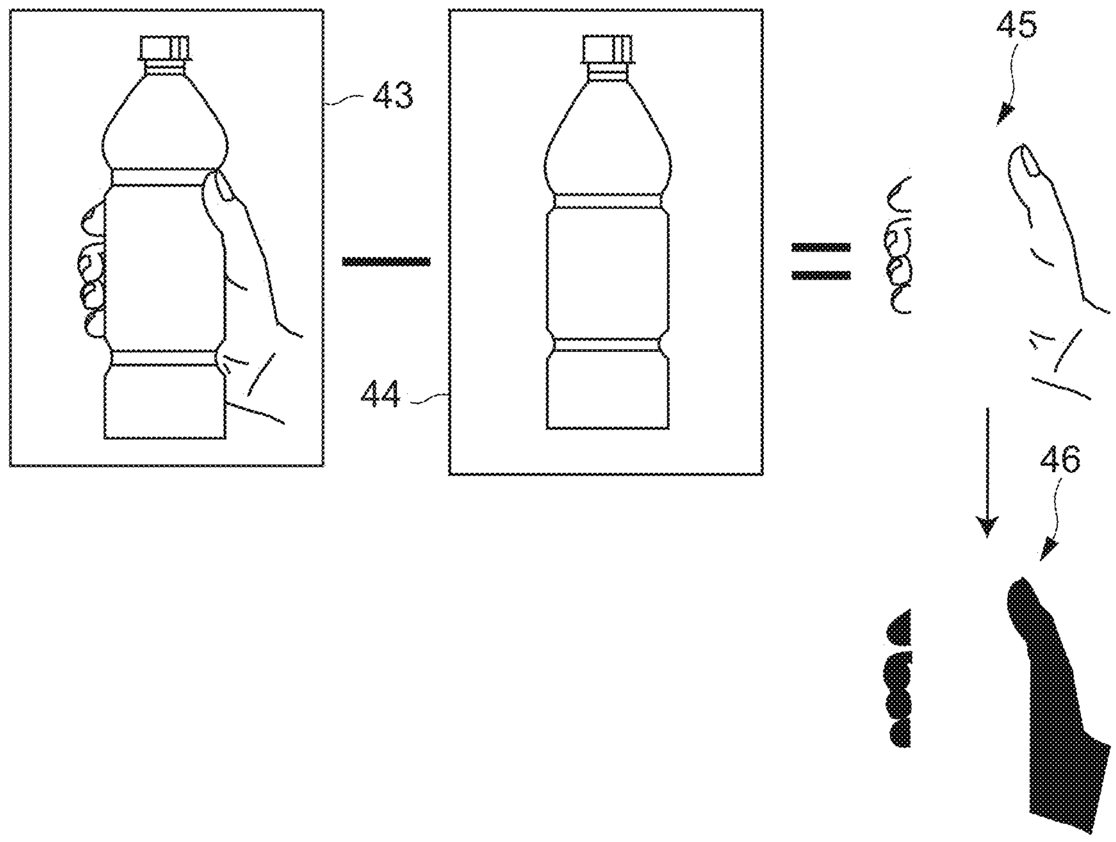

FIGS. 4A and 4B are schematic views in a case of calculating a hand area by the second method. FIG. 4A is a schematic view showing a dataset. FIG. 4B is a schematic view showing the hand area.

The predictor used for the second method receives the intended operation and the captured image including the target object as input data. Moreover, the predictor calculates a hand area when the person holds the target object for the intended operation as output data by using a neural network (NN).

An intended operation, an image of a target object, and a black and white image (binary image) representing a hand area when a person holds the target object for performing the intended operation are used for a dataset (second learning dataset) used in learning for the predictor. For example, in FIG. 4A, an intended operation 40 (pour), an image of a plastic bottle 41, and a black and white image 42 representing the hand area when the person holds the plastic bottle are used for the dataset.

In the present embodiment, the hand area is calculated on the basis of a difference between the image when the person holds the target object for performing the intended operation and the captured image including the target object. For example, as shown in FIG. 4B, a hand area 45 is extracted on the basis of a difference between an image 43 when the person holds the plastic bottle and a captured image 44 including the plastic bottle. A black and white image 46 is generated by converting the extracted hand area 45 into black and white.

It should be noted that the method of generating the black and white image is not limited. Moreover, for generating the black and white image, target objects used in the image in which the person holds the target object for performing the intended operation and the captured image including the target object need to be the same and the position and attitude of a camera and position and attitude of the object also need to be the same.

The operation setting unit 24 sets an operation to be executed by the robot arm 10. In the present embodiment, the operation setting unit 24 sets an intended operation by an operation or voice (language information) by the user. The intended operation "pour" is set for example by the user inputting an operation of pouring or the like as language information via a microphone. The set intended operation is provided to the region calculation unit 23.

The hold point determination unit 25 determines the hold point in accordance with the intended operation. In the present embodiment, the hold point determination unit 25 determines the hold point from among hold candidate points calculated by the hold candidate point calculation unit 33 on the basis of the intended operation and the hand area.

For example, the hold point determination unit 25 determines a hold candidate point outside the calculated hand area as the hold point in a case where an instruction information, e.g., "pass", is set as the intended operation. Moreover, for example, in a case where execution information, e.g., "pour", is set as the intended operation, the hold point determination unit 25 determines a hold candidate point inside the calculated hand area as the hold point.

That is, in a case of passing the target object to the user, the hold candidate point outside the hand area is determined as the hold point in order for the user to easily hold it. Moreover, in a case where the robot arm 10 itself executes the operation, the hand area when the user holds it (position where the user can easily hold the target object) is determined as the hold point. For example, in a case where the intended operation is "pour", it is possible to prevent a cap of the plastic bottle from being held.

The operation execution unit 26 outputs a control signal for controlling the robot arm 10 in accordance with the hold point and the intended operation. In the present embodiment, the operation execution unit 26 outputs to the arm control unit 7 a control signal for causing the robot arm 10 to hold the determined hold point and execute the set operation. For example, the operation execution unit 26 outputs a control signal for executing driving control to move and rotate the holding part of the robot arm 10 and rotate each joint part.

It should be noted that in the present embodiment, the region calculation unit 23 corresponds to a region calculation unit that calculates, on the basis of operation information regarding an operation performed on a target object and an image of the target object, a hand area when the operation is performed on the target object by using an image generator or a predictor.

It should be noted that in the present embodiment, the hold point determination unit 25 corresponds to a hold point calculation unit that calculates a hold point of a robot arm that performs the operation on the target object on the basis of the calculated hand area.

It should be noted that in the present embodiment, the operation execution unit 26 corresponds to an output unit that outputs a control signal for causing the robot arm to execute the operation on the basis of the calculated hold point.

Figure 5:
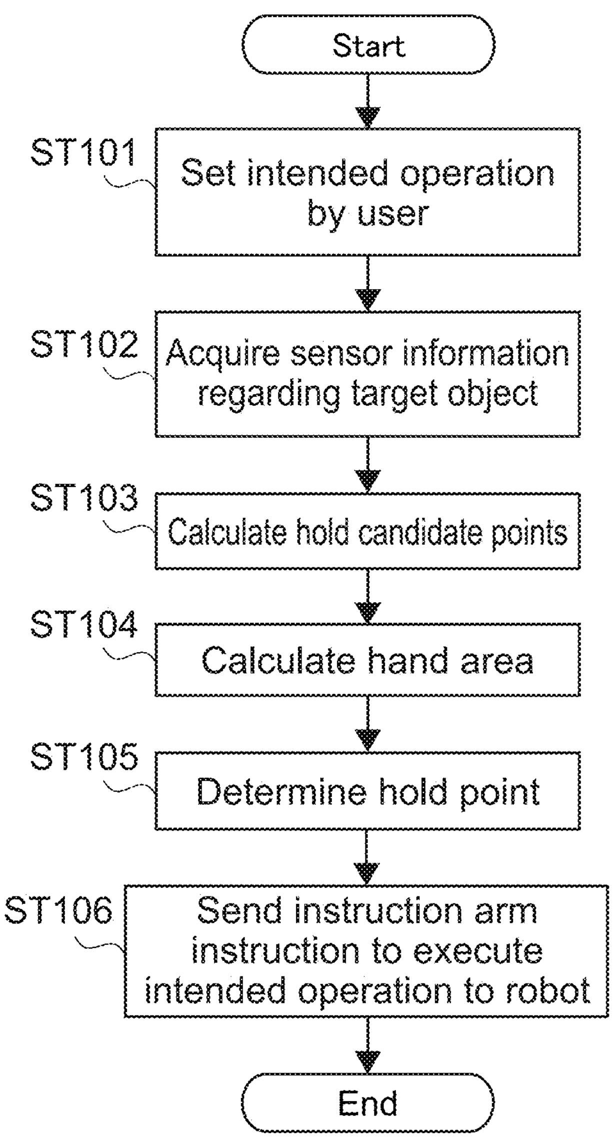
FIG. 5 A flowchart until holding a target object.

FIG. 5 is a flowchart until holding a target object.

As shown in FIG. 5, the user sets an intended operation (Step 101). The sensor information acquisition unit 21 acquires sensor information regarding a target object located around the robot arm 10 acquired by the sensor unit 6 (Step 102).

The hold candidate point calculation unit 22 calculates hold candidate points for the target object (Step 103). It should be noted that the number of target objects is not limited, and all target objects acquired by the sensor unit 6 may be set as target objects and hold candidate points for all the objects may be calculated.

Moreover, on the basis of the intended operation, an object on which the intended operation can be executed may be selected as a target object from among objects located around the robot arm 10, and a hold point may be calculated. For example, in a case where the intended operation is "pour" and the objects located around the robot arm 10 are a plastic bottle, a dice, and a pen, the plastic bottle may be selected as the target object.

The region calculation unit 23 calculates a hand area depending on the intended operation on the target object (Step 104). The hold point determination unit 25 determines a hold point on the basis of the intended operation and the hand area (Step 105).

The operation execution unit 26 outputs a control signal for controlling the robot arm 10 in accordance with the hold point and the intended operation (Step 106). Accordingly, the arm control unit 7 controls the robot arm 10 to execute the given operation.

In this manner, the information processing apparatus 20 according to the present embodiment calculates, by using an image generator or a predictor, the hand area when the operation is performed on the target object 1 on the basis of the operation information regarding the operation performed on the target object 1 and the image of the target object 1. This enables a high-precision operation.

Conventionally, it is difficult to precisely execute a required operation when a machine such as a robot arm holds the object. A hold point of an object can also be inferred on the basis of sensor information for example by a deep learning technology. In this case, it is possible to hold the object at the hold point only by mechanical analysis, but it is difficult to achieve an operation, e.g., to open a cap. In order to solve this, a learning dataset including a set of an intended operation, a hold target object, and a hold point for the operation is determined. In order to generate such a dataset, three-dimensional position and attitude of a human hand has to be estimated, so it is difficult to build a system.

In the present technology, the hand area when the person holds the target object for the intended operation is calculated on the basis of the intended operation and an image of the hold target object by using an image generator or a predictor. For the image generator, it is sufficient that the dataset used in learning is three, an intended operation, an image of a hold target object, and an image when the person holds the target object in the operation. That is, it is unnecessary to estimate the three-dimensional position and attitude of the human hand and it is possible to easily collect data by the use of a simple sensor such as a camera.

Similarly, for the predictor, it is sufficient that the dataset used in learning is three, an intended operation, an image of a hold target object, and a black and white image representing the hand area when the person holds the target object in the operation. That is, it is unnecessary to estimate the three-dimensional position and attitude of the human hand. As compared to the image generator, the learning difficulty is lower, but it is necessary to generate the black and white image representing the hand area.

Moreover, how the person holds the hold target object can be estimated by the use of the image generator. Accordingly, in a case where the robot arm hands over an object to the person, a portion wished to be held by the person can be predicted on the basis of a generated image, and the robot arm can smoothly hand over it to the person.

Moreover, in the present technology, it is possible to calculate a hold point considering the intended operation by using a dataset that can be more easily collected. Since the dataset can be easily collected, a massive amount of datasets can be built and can be applied to various target objects.

Other Embodiments

The present technology is not limited to the above-mentioned embodiments, and various other embodiments can be realized.

In the above-mentioned embodiment, the hold point is set using the holding part 5 of the robot arm 10 as a reference. The present technology is not limited thereto, and the hold point may be set using the target object as a reference.

Figure 6:
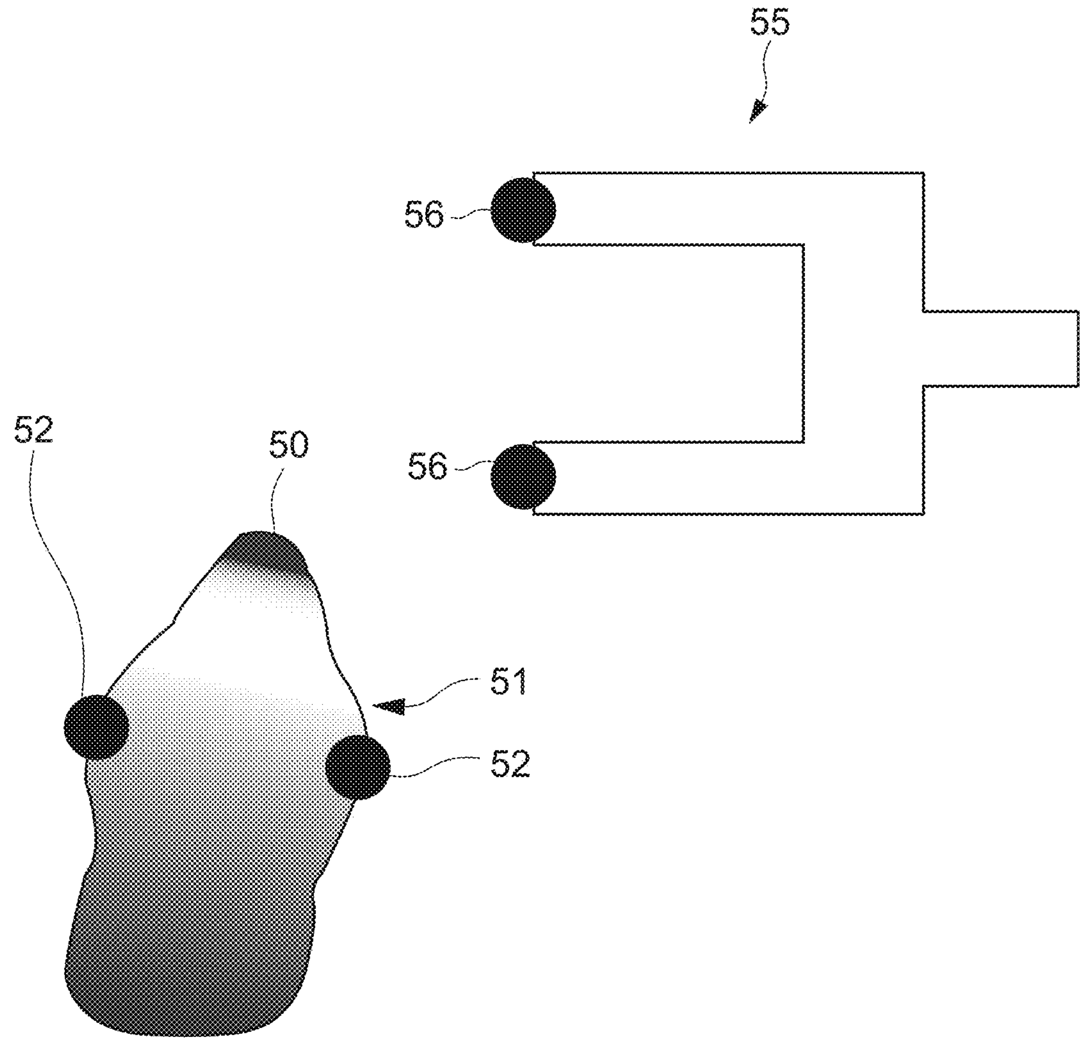
FIG. 6 A schematic view showing a hold point.

FIG. 6 is a schematic view showing a hold point.

As shown in FIG. 6, a heat map 51 showing portions easy to be held for a holding part 55 may be generated with respect to a target object 50. For example, in a case where the holding part 55 is a two-finger parallel gripper, the hold point determination unit 25 calculates two points on the target object 50 as hold points 52 on the basis of the heat map 51.

The operation execution unit 26 outputs a control signal for adjusting the position and attitude of the holding part 55 (point 56) to the calculated hold points 52.

It should be noted that the method of generating the heat map is not limited. For example, the heat map may be generated by mechanical analysis or may be generated on the basis of target object content, surface material, performance of the holding part 5, and the like.

In the above-mentioned embodiment, all objects located around the robot arm 10 are handled as target objects. The present technology is not limited thereto, and an object that meets the intended operation may be selected as a target object. For example, in a case where the intended operation is "pour", a container (can or plastic bottle) capable of storing liquid may be selected as a target object. For example, in a case where the intended operation is "open", an object with a cap may be selected.

In the above-mentioned embodiment, the intended operation includes the operation, the instruction information, and the operation information. The present technology is not limited thereto, and the intended operation may include information specifying a target object. For example, information specifying (limiting) a target object, e.g., "pour from a plastic bottle" or "open a cap of a can", may be set as the intended operation.

In the above-mentioned embodiment, the hold point is calculated on the basis of the intended operation. The present technology is not limited thereto, and the hold point may be calculated on the basis of various conditions other than the intended operation. The hold point may be calculated for example on the basis of mass, temperature, and weight center position of the target object. Moreover, a dataset including these conditions may be generated and various sensors for acquiring these conditions may be mounted on the robot arm.

In the above-mentioned embodiment, the hold point is determined from among the hold candidate points on the basis of whether or not it is included in the hand area. The present technology is not limited thereto, and the hold point may be determined using any algorithm. For example, hold candidate points at a predetermined distance from the hand area may be removed.

FIG. 7 is a block diagram showing hardware configuration examples of the information processing apparatus 20.

The information processing apparatus 20 includes a CPU 61, a ROM 62, a RAM 63, an input/output interface 65, and a bus 64 that connects them to one another. A display unit 66, an input unit 67, a storage unit 68, a communication unit 69, a drive unit 70, and the like are connected to the input/output interface 65.

The display unit 66 is, for example, a display device using liquid crystals, EL, or the like. The input unit 67 is, for example, a keyboard, a pointing device, a touch panel, or another operation device. In a case where the input unit 67 includes a touch panel, the touch panel can be integral with the display unit 66.

The storage unit 68 is a nonvolatile storage device. The storage unit 68 is, for example, an HDD, a flash memory, or another solid-state memory. The drive unit 70 is, for example, a device capable of driving a removable recording medium 71 such as an optical recording medium or a magnetic record tape.

The communication unit 69 is a modem, a router, or another communication device for communicating with other devices, which is connectable to a LAN, a WAN, or the like. The communication unit 69 may perform wired communication or may perform wireless communication. The communication unit 69 is often used separately from the information processing apparatus 20.

Cooperation of software stored in the storage unit 68, the ROM 62, or the like with hardware resources of the information processing apparatus 20 achieves information processing of the information processing apparatus 20 having the hardware configurations as described above. Specifically, loading a program that configures the software, which has been stored in the ROM 62 or the like, to the RAM 63 and executing it achieves the information processing according to the present technology.

The information processing apparatus 20 installs the program via the recording medium 71, for example. Alternatively, the information processing apparatus 20 may install the program via a global network or the like. Otherwise, any computer-readable non-transitory storage medium may be used.

Cooperation of a computer mounted on a communication terminal with another computer capable of communicating with it via a network or the like may execute the information processing method and the program according to the present technology and configure the generation unit according to the present technology.

That is, the information processing apparatus, the information processing method, the program, and the information processing system according to the present technology may be performed not only in a computer system constituted by a single computer but also in a computer system in which a plurality of computers cooperatively operate. It should be noted that in the present disclosure, the system means a set of a plurality of components (e.g., apparatuses, modules (parts)) and it does not matter whether or not all the components are housed in the same casing. Therefore, both of a plurality of apparatuses housed in separate casings and connected to one another via a network and a single apparatus having a plurality of modules housed in a single casing are the system.

Executing the information processing apparatus, the information processing method, the program, and the information processing system according to the present technology by the computer system includes, for example, both of a case where a single computer executes calculation of the hold candidate point, calculation of the hand area, and determination of the hold point, and the like, and a case where different computers execute the respective processes. Moreover, executing the respective processes by a predetermined computer includes causing another computer to execute some or all of those processes and acquiring the results.

That is, the information processing apparatus, the information processing method, the program, and the information processing system according to the present technology can also be applied to a cloud computing configuration in which a plurality of apparatuses shares and cooperatively processes a single function via a network.

The respective configurations such as the region calculation unit, the hold point determination unit, and the operation execution unit, the control flow of the communication system, and the like, which have been described with reference to the respective drawings, are merely embodiments, and can be arbitrarily modified without departing from the gist of the present technology. That is, any other configurations, algorithms, and the like for carrying out the present technology may be employed.

It should be noted that the effects described in the present disclosure are merely exemplary and not limitative, and further other effects may be provided. The description of the plurality of effects above does not necessarily mean that those effects are provided at the same time. It means that at least any one of the above-mentioned effects is obtained depending on a condition and the like, and effects not described in the present disclosure can be provided as a matter of course.

At least two features of the features of the above-mentioned embodiments may be combined. That is, the various features described in the respective embodiments may be arbitrarily combined across the respective embodiments.

It should be noted that the present technology can also take the following configurations.

(1) An information processing apparatus, including a region calculation unit that calculates, on the basis of operation information regarding an operation performed on a target object and an image of the target object, a hand area when the operation is performed on the target object by using an image generator or a predictor.

(2) The information processing apparatus according to (1), in which the image generator generates a pseudo-image when the operation is performed on the target object on the basis of the operation information and the image of the target object.

(3) The information processing apparatus according to (1), in which the image generator sets the operation information, the image of the target object, and an image when the operation is performed on the target object as a first learning dataset.

(4) The information processing apparatus according to (2), in which the region calculation unit calculates the hand area on the basis of a difference between the pseudo-image and the image of the target object.

(5) The information processing apparatus according to (1), in which the predictor sets a black and white image indicating the operation information, the image of the target object, and the hand area when the operation is performed on the target object as a second learning dataset.

(6) The information processing apparatus according to (1), in which the operation is an operation executed in a state of holding the target object.

(7) The information processing apparatus according to (1), in which the operation is performed by a robot arm.

(8) The information processing apparatus according to (1), further including a hold point calculation unit that calculates a hold point of a robot arm that performs the operation on the target object on the basis of the calculated hand area.

(9) The information processing apparatus according to (8), in which the hold point is a parameter regarding position and attitude of a holding part of the robot arm that holds the target object.

(10) The information processing apparatus according to (9), in which the parameter includes x-coordinate, y-coordinate, z-coordinate, roll, pitch, and yaw.

(11) The information processing apparatus according to (8), in which the operation information includes instruction information for passing the target object to a user or execution information for causing the robot arm to execute the operation, and the hold point calculation unit calculates the hold point on the basis of the operation information.

(12) The information processing apparatus according to (11), in which the hold point includes a hold candidate point where the robot arm is capable of holding the target object, and the hold point calculation unit removes the hold candidate point included in the hand area and calculates the hold point on the basis of the instruction information.

(13) The information processing apparatus according to (11), in which the hold point includes a hold candidate point where the robot arm is capable of holding the target object, and the hold point calculation unit calculates the hold candidate point included in the hand area as the hold point on the basis of the execution information.

(14) An information processing method, including by a computer system, calculating, on the basis of operation information regarding an operation performed on a target object and an image of the target object, a hand area when the operation is performed on the target object by using an image generator or a predictor.

(15) A program that causes a computer system to execute:

a step of calculating, on the basis of operation information regarding an operation performed on a target object and an image of the target object, a hand area when the operation is performed on the target object by using an image generator or a predictor.

(16) An information processing system, including:

a robot arm that performs an operation on a target object; and an information processing apparatus including a region calculation unit that calculates, on the basis of operation information regarding an operation performed on a target object and an image of the target object, a hand area when the operation is performed on the target object by using an image generator or a predictor.

(17) The information processing system according to (16), further including a hold point calculation unit that calculates a hold point of the robot arm on the basis of the calculated hand area.

(18) The information processing system according to (17), further including an output unit that outputs a control signal for causing the robot arm to execute the operation on the basis of the calculated hold point.

(19) The information processing system according to (16), in which the robot arm includes a sensor unit, and the sensor unit acquires the image of the target object.

REFERENCE SIGNS LIST

1 target object
5 holding part
10 robot arm
20 information processing apparatus
23 region calculation unit
25 hold point determination unit
26 operation execution unit
100 information processing system

The invention claimed is:

1. An information processing method, comprising:

by a computer system;

receiving an image of a target object from a sensor via a network;

setting operation information associated with an operation executable on the target object;

calculating a hand area of a robotic machine based on the operation information and the image of the target object; and controlling, based on a neural network model, movement of the robotic machine to execute the operation on the target object, wherein the movement of the robotic machine is controlled based on the calculated hand area of the robotic machine, and the neural network model includes one of an image generator or a predictor.

2. A non-transitory computer-readable medium having stored thereon, computer-executable instructions which, when executed by a computer, cause the computer to execute operations, the operations comprising:

receiving an image of a target object from a sensor via a network;

setting operation information associated with an operation executable on the target object;

calculating a hand area of a robotic machine based on the operation information and the image of the target object; and controlling, based on a neural network model, movement of the robotic machine to execute the operation on the target object, wherein the movement of the robotic machine is controlled based on the calculated hand area of the robotic machine, and the neural network model includes one of an image generator or a predictor.

3. An information processing apparatus, comprising a Central Processing Unit (CPU) configured to:

receive an image of a target object from a sensor via a network;

set operation information associated with an operation executable on the target object;

calculate a hand area of a robotic machine based on the operation information and the image of the target object; and control, based on a neural network model, movement of the robotic machine to execute the operation on the target object, wherein the movement of the robotic machine is controlled based on the calculated hand area of the robotic machine, and the neural network model includes one of an image generator or a predictor.

4. The information processing apparatus according to claim 3, wherein the CPU is further configured to control the image generator to generate a pseudo-image of the operation executed on the target object, and the operation is executed on the target object based on the operation information and the image of the target object.

5. The information processing apparatus according to claim 3, wherein the CPU is further configured to control the image generator to set each of the operation information, the image of the target object, and a specific image as a first learning dataset, and the specific image indicates the operation executed on the target object.

6. The information processing apparatus according to claim 4, wherein the CPU is further configured to calculate the hand area based on a difference between the pseudo-image and the image of the target object.

7. The information processing apparatus according to claim 3, wherein the CPU is further configured to control the predictor to set each of a black and white image, the image of the target object, and the hand area as a second learning dataset, the black and white image indicates the operation information, and the hand area indicates an area of a hand at a time the operation is executed on the target object.

8. The information processing apparatus according to claim 1, wherein the operation corresponds to an operation executed in a state the target object is held.

9. The information processing apparatus according to claim 3, wherein the robotic machine is a robot arm, and the operation is executed by the robot arm.

10. The information processing apparatus according to claim 1, wherein the robotic machine is a robot arm, and the CPU is further configured to calculate a hold point of the robot arm based on the calculated hand area.

11. The information processing apparatus according to claim 10, wherein the hold point is a parameter regarding position and attitude of a holding part of the robot arm; and the holding part holds the target object.

12. The information processing apparatus according to claim 11, wherein the parameter includes x-coordinate, y-coordinate, z-coordinate, roll, pitch, and yaw.

13. The information processing apparatus according to claim 10, wherein the operation information includes at least one of instruction information or execution information, the instruction information includes an instruction to pass the target object to a user, and the CPU is further configured to:

control the robot arm to execute the operation based on the execution information; and calculate the hold point based on the operation information.

14. The information processing apparatus according to claim 13, wherein the hold point includes a hold candidate point, the target object is held by the robot arm at the hold candidate point, and the CPU is further configured to:

remove the hold candidate point included in the hand area; and calculate the hold point based on the instruction information and the removal of the hold candidate point.

15. The information processing apparatus according to claim 13, wherein the hold point includes a hold candidate point, the target object is held by the robot arm at the hold candidate point, and the CPU is further configured to calculate the hold candidate point included in the hand area as the hold point based on the execution information.

16. An information processing system, comprising:

a robot arm configured to execute an operation on a target object; and an information processing apparatus, wherein the information processing apparatus includes a Central Processing Unit (CPU) configured to:

receive an image of the target object from a sensor via a network;

set operation information associated with the operation executable on the target object;

calculate a hand area of the robot arm based on the operation information and the image of the target object; and control, based on a neural network model, movement of the robot arm to execute the operation on the target object, wherein the movement of the robot arm is controlled based on the calculated hand area of the robot arm, and the neural network model includes one of an image generator or a predictor.

17. The information processing system according to claim 16, wherein the CPU is further configured to calculate a hold point of the robot arm based on the calculated hand area.

18. The information processing system according to claim 17, wherein the CPU is further configured to control the robot arm to execute the operation, wherein the operation is executed based on the calculated hold point, and the robot arm is controlled based on a control signal.

19. The information processing system according to claim 16, wherein the robot arm includes a sensor, and the sensor is configured to acquire the image of the target object.

* * * * *